UNITED STATES PATENT OFFICE

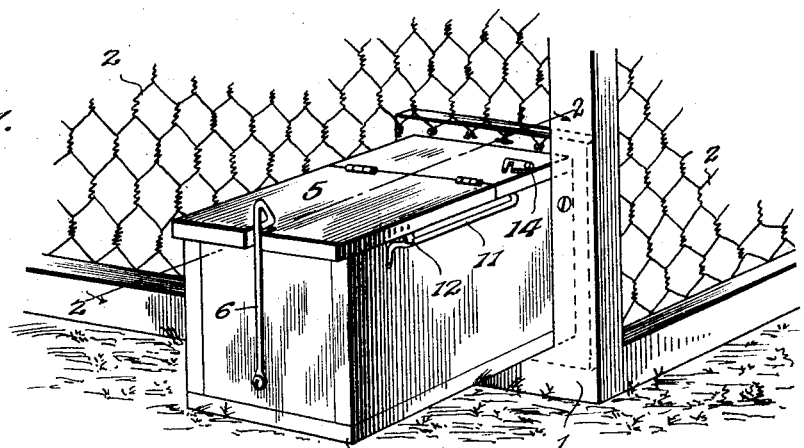
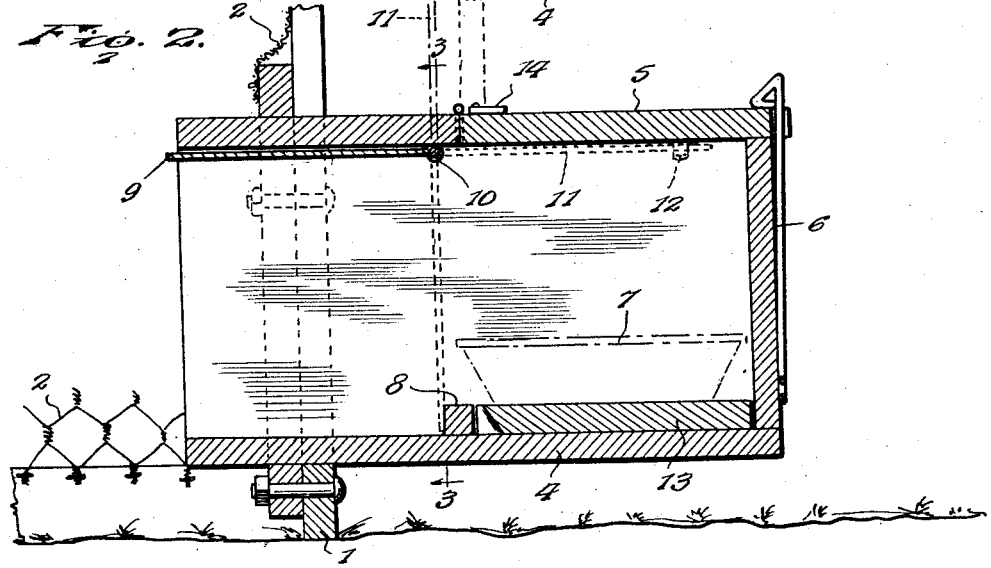
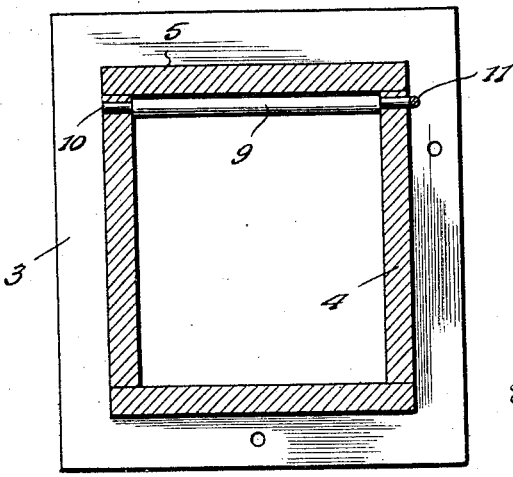

FRANK R. RITCHIE, OF CHIPPEWA FALLS, WISCONSIN

ANIMAL FEEDER

Application filed May 13, 1930. Serial No. 452,030.

This invention appertains to the feeding of small fur bearing animals such as mink and foxes and precludes the necessity of entering the enclosure to deposit feed and to remove the container in which the feed was supplied.

In accordance with the invention, a box is fitted to the enclosure and permanently attached thereto, and is readily accessible to the animals from within the enclosure and to an attendant from without the enclosure, there being a gate to cut off passage through the box to prevent the escape of an animal when placing feed in the box or cleaning the same.

While the drawing illustrates a preferred embodiment of the invention, it is to be understood that in adapting the means to meet specific needs and requirements, the design may be varied and changes in the minor details of construction may be resorted to within the scope of the invention as claimed, without departing from the spirit thereof.

For a full understanding of the invention and the merits thereof, reference is to be had to the following description and the drawing hereto attached, in which:

Figure 1 is a perspective view of an embodiment of the invention, showing it applied.

Figure 2 is an enlarged vertical central longitudinal sectional view thereof on the line 2—2 of Figure 1.

Figure 3 is a transverse sectional view on the line 3—3 of Figure 2.

Corresponding and like parts are referred to in the following description and designated in the several views of the drawing by like reference characters.

The numeral 1 designates the frame of an enclosure or pen corralling the animals to be fed, such as mink and foxes. A wire fabric 2 is attached to the framework and forms the enclosing sides.

The feeder is in the form of a box and is preferably located at a lower corner of the pen or enclosure and is attached to the framework and wire fabric. A cleat or flange 3 projects outwardly from the box a short distance from the inner end thereof and is fastened to members of the frame and a side of the pen or enclosure. The box 4 is usually constructed of wood and is elongated and of rectangular outline in cross section, and is closed at its outer end, top, bottom and sides, the inner end being open for ready ingress and egress of the animals. A portion of the top of the box 4 is closed by a hinged cover 5 which is adapted to swing inwardly and upwardly to an opened position. A suitable catch 6 secures the cover 5 when closed. The major portion of the box 4 is disposed outwardly from the pen and is adapted to receive the feed which is contained in a pan 7 or other convenient receptacle placed in position through the opening in the top of the box closed by means of the cover 5. A strip 8 is attached to the bottom of the box transversely thereof and provides a stop against which a gate 9 is adapted to engage when swung downwardly into a vertical position to form a barrier and prevent escape of the animals from the pen when the cover 5 is opened.

A rod 10 serving as a mounting for the gate 9 is journaled in opposite side walls of the box 4 adjacent the top thereof and the gate 9 is fixedly attached thereto and is moved into open and closed position by rotation of the rod. The rod projects from one side of the box and is bent to form an actuating arm 11 which terminates in a finger piece. A catch 12 projecting from a side of the box is adapted to engage the arm 11, as indicated most clearly in Figure 1 of the drawing, to hold the gate 9 in an open position. The arm 11 being resilient, it is adapted to be sprung laterally into and out of engagement with the catch 12. The gate 9 and arm 11 extend in opposite directions from the rod 10 and when the arm 11 is moved into a vertical position, the gate 11 swings downwardly into a closed position, as indicated by dotted lines in Figure 2, and has its lower end bearing against the stop 8.

A feed board 13 rests loosely upon the outer portion of the bottom of the box and is readily removable through the opening in the top when the cover 5 is opened. The container 7 holding the feed is placed upon the board 13 and when necessary, the board 13 may be removed and scraped and washed to maintain it in thorough sanitary condition.

The feeder precludes the necessity for entering the pen to place feed therein or to remove the container, as will be readily appreciated. When placing feed or removing the container or feed board, escape of the animals is prevented by closing the door 9. A catch 14 pivoted to the top of the box, is adapted to engage the arm 11 when swung into a vertical position, thereby securing the gate 9 against accidental opening when swung downwardly into closed position.

What is claimed is:

1. The combination with an enclosure having an opening in a side wall thereof, of a box extending through the opening and having a portion thereof disposed within the enclosure and a portion exterior thereto, the portion of the box exterior to the enclosure having its inner end closed and its top formed with an opening, a cover closing said opening, fastening means carried by said closed end and engaging the cover for securing said cover in closed position, the end of the box within the enclosure being open, a gate adapted to extend across the box between the cover and the open end of the box, fastening means for securing the gate in open or closed position, and a flange extending about the box within the enclosure and secured against the side wall of said enclosure.

2. A feed box having one end open and having its other end portion formed with an opening in its top, a cover normally closing the opening in the top, means for fastening the cover when closed, a gate, a rod pivoting the gate beneath the top of the box back of the opening, whereby the gate may be swung upward into open position and downward into closed position, said rod extending from one of the side walls of the box and having its outer portion bent to form an actuating arm, and fastening means on the box coacting with the arm to secure the gate in either open or closed position.

In testimony whereof I affix my signature.

FRANK R. RITCHIE. [L. S.]